United States Patent [19]

Cooper, Jr. et al.

[11] 4,262,402

[45] Apr. 21, 1981

[54] METHOD FOR SERVICING A STEAM GENERATOR

[75] Inventors: Frank W. Cooper, Jr.; Raymond P. Castner, both of Monroeville, Pa.

[73] Assignee: Westinghouse Electric Corp., Pittsburgh, Pa.

[21] Appl. No.: 952,431

[22] Filed: Oct. 18, 1978

[51] Int. Cl.³ .............................................. B23P 15/26

[52] U.S. Cl. .................................. 29/157.4; 29/33 T; 29/727; 228/7; 228/183; 408/1 R; 408/3

[58] Field of Search .................. 29/157.3 C, 157.3 R, 29/157.4, 33 G, 33 T, 726, 727; 408/1, 3; 228/183, 7

[56] References Cited

U.S. PATENT DOCUMENTS

| | | | |
|---|---|---|---|
| 2,922,332 | 1/1960 | Lentz et al. | 235/151.11 |
| 3,598,978 | 8/1971 | Rempert | 235/151.11 |
| 3,633,011 | 1/1972 | Bederman et al. | 235/151.11 |
| 3,764,775 | 10/1973 | Hasslinger et al. | 219/121 L |
| 3,898,440 | 8/1975 | Fukuma et al. | 235/151.11 |
| 3,973,859 | 8/1976 | Huber et al. | 408/3 X |
| 4,011,437 | 3/1977 | Hohn | 235/151.11 |
| 4,018,346 | 4/1977 | Leshem et al. | 214/1 CM |

*Primary Examiner*—Carl E. Hall
*Attorney, Agent, or Firm*—Daniel C. Abeles

[57] ABSTRACT

A servicing machine for a steam generator is accurately set up in the generator channel head with a pivoted arm mounted for rotation in a plane parallel to the tubesheet. The angular position of the arm, the longitudinal position of a carriage mounted on the arm and the vertical position of a platform on the carriage are remotely controlled to maneuver a probe used in mapping the precise location of the thousands of holes in the tubesheet. Various operations are then performed at each precise hole location by tools carried by the arm mounted carriage to prepare for installation of new tubing. The operation of a pair of remotely controlled pivoted arms, one on each side of the channel head divider plate, is coordinated to automatically position the ends of U-shaped tubes in corresponding holes in the tubesheet on opposite sides of the divider plate and to secure the same in place.

9 Claims, 16 Drawing Figures

METHOD FOR SERVICING A STEAM GENERATOR

CROSS-REFERENCE TO RELATED APPLICATIONS

This application is hereby cross-referenced to the following commonly assigned United States patent applications:

Application Ser. No. 888,701 filed on Mar. 21, 1978 in the name of Lenard R. Golick and entitled "Apparatus for Remotely Repairing Tubes in a Steam Generator";

Application Ser. No. 952,433 filed concurrently herewith in the name of Lenard R. Golick and entitled "Set Up Method and Apparatus for Steam Generator Tube Installation Apparatus"; and Application Ser. No. 952,430 filed concurrently herewith in the names of Kenneth S. Gerkey, Raymond P. Castner and Richard L. Stiller and entitled "Heat Exchanger Tube and Tubesheet Location Sensing Device and Method of Operation.

BACKGROUND OF THE INVENTION

1. Field of the Invention

This invention relates to a method and apparatus for servicing a steam generator and, more particularly, to a method and apparatus for remotely servicing the tubes and tubesheet of such a generator.

2. Prior Art

In a pressurized water nuclear powered electric generating system, the heat generated by the nuclear reaction is absorbed by a primary coolant that circulates through the reactor core and is utilized to generate steam in a steam generator. The steam generator typically is an upright cylindrical pressure vessel with hemispherical end sections. A transverse plate called a tubesheet, located at the lower end of the cylindrical section, divides the steam generator into a primary side, which is the lower hemispherical section below the tubesheet, and a secondary side above the tubesheet. A vertical wall bisects the primary side into an inlet section and an outlet section. The tubesheet is a thick carbon steel plate with an array of thousands of holes into which are inserted the ends of U-shaped tubes. One end of each U-shaped tube is inserted into a hole in the tubesheet which communicates with the inlet section of the primary side and the other end is inserted in a hole which communicates with the outlet section. The primary coolant is introduced under pressure into the inlet section of the primary side, circulates through the U-shaped tubes and exits through the outlet section. Water introduced into the secondary side of the steam generator circulates around the U-shaped tubes and is transformed into steam by heat given up by the primary coolant.

Occasionally during the operation of the steam generator, leaks develop in some of the tubes. This is undesirable because the primary coolant is radioactive and any cross-feed of reactor coolant into the secondary side of the generator contaminates the steam. It is not practical, however, to replace leaky tubing as it occurs, but instead the steam generator is taken out of service temporarily and the affected tubes are plugged at both ends. In view of the thousands of tubes in the steam generator, plugging of a few does not appreciably affect the efficiency of heat transfer.

Eventually, however, a sufficient number of tubes may be plugged to adversely affect heat transfer and generator efficiency. More often, the steam generator is shut down for scheduled retubing of the entire unit. In the retubing process, all the tube holes, including any plugged holes, are drilled out and spot-faced from the primary side and the tubes are then pulled out from the secondary side. New tubes are inserted from the secondary side with tube guides inserted in the tube ends to ease their passage through holes in transverse support plates on the secondary side and the appropriate holes in the inlet and outlet sides of the tubesheet. The tube guides are then removed from the primary side and the ends of the tubes are aligned with the spot-faced end of the hole in the tubesheet, tack rolled and then welded in place.

While space to maneuver is not a particular problem on the secondary side of the steam generator, the radius of the partitioned, hemispherical primary side is typically approximately five feet which does not provide much working room especially near the circumference of the tubesheet. In addition, the primary side is radioactive which requires worker protection and limitation of exposure time.

In an initial attempt to at least partially automate refurbishing of steam generators, a tool fixture was developed which cam locked into holes in the tubesheet to support a tool with an automatic feed. Only the drilling and spot-facing operation and the welding were performed by this unit and a worker was required to enter the confined primary side of the generator to move the fixture from one hole set to the next. In view of the thousands of holes in the typical tubesheet, this procedure was very time consuming.

Subsequently, a fixture was developed which can be "walked" from hole to hole by an operator outside the steam generator. In this machine, the operator manipulates a scale model to move the cam locks from one hole to another by reference to a television screen. While this machine speeds up the drilling/spot-facing operation and the welding and reduces worker exposure to radioactivity, it requires a skilled operator, still takes longer than desirable and does not perform all of the required operations so that a workman must still spend a considerable amount of time in the primary side of the generator. In addition, with both of these prior art fixtures the tube holes are spot-faced to a depth which is referenced to the face of the tubesheet adjacent the hole and not to a common plane.

It is a primary object of this invention to provide a method and apparatus which automates all the retubing operations to minimize downtime and worker exposure to radiation.

It is another object of this invention to provide such a method and apparatus which accommodates for the imprecise location of tube holes and provides a map of the exact locations.

It is yet another object of this invention to provide such a method and apparatus which accommodates for imperfections in the flatness of the tubesheet surface.

It is a more specific objective of the invention to provide a method and apparatus such as in the previous object for spot-facing the tube holes to a common plane despite imperfections in flatness of the tubesheet.

It is still another object of the invention to provide a method and apparatus which coordinates retubing operations on both the inlet and outlet sections of the steam generator primary side.

It is also an object of this invention to provide a method and apparatus for precise alignment of the apparatus with the tubesheet, taking into account imprecise orientation of the tubesheet in the steam generator.

SUMMARY OF THE INVENTION

According to the invention, a steam generator is serviced by mapping the tubesheet with a probe to precisely locate each hole in the sheet and storing each such precise location. The stored locations are then used to maneuver various tools into position to perform one or more operations at each tube hole. These operations may include drilling out old tubes and spot-facing the drilled out holes, preferably to a common plane; inserting new tubes in the holes and aligning the ends thereof flush with the spot-face; cleaning the tubesheet and tube end with a wire brush; securing the tube ends in place, first by expanding the tubes and then by welding; and then brushing and remotely inspecting the welds.

The mapping is performed by maneuvering a probe responsive to the walls of the holes in the tubesheet into approximate alignment with a hole, advancing the probe into the hole, maneuvering it until it is centered in the hole and then recording the hole location. In the preferred embodiment of the invention, the angular position of an arm mounted for rotation parallel to the tubesheet and the position of a carriage movable along the arm are adjusted to align the probe with the holes. After the precise location of a hole is stored, the arm and carriage positions are adjusted to advance the probe a first preset distance in a direction parallel to the row to generally align the probe with the next hole to be probed and the probe is advanced in this manner down the row. The probe is then maneuvered a second preset distance in a direction parallel to the columns and the same procedure is repeated to precisely locate selected holes in another row. Thus, rather than accumulating errors, the probe is maneuvered to the general location of a hole by advancing it the preset distance from the precise location of the previous probed hole in the array.

When the first and second preset distances are equal to the nominal distances between columns and rows respectively, each hole in the array is probed. On the other hand, when the preset distances are equal to multiples of the nominal row and column spacing, only a portion of the holes are probed and the locations of the other holes are determined by appropriately adding or subtracting the nominal row and column spacings to the measured coordinates of the nearest probed hole.

In order to assure precise alignment of the elongated arm parallel to the tubesheet before mapping, electrical signals representative of the distance from the free end of the arm to the tubesheet at three angular positions are generated and the pivot axis of the arm is adjusted relative to the tubesheet until the three electrical signals are brought within a preset tolerance of being equal. With the arm pivoted about a point located near the center of the straight side of one semicircular half of the tubesheet, the flatness of the tubesheet can be determined by generating a fourth electrical signal representative of the distance from the arm to the tubesheet at a point near the pivot point of the arm and comparing it with the other signals. The resulting signal is then used in guiding a drill to spot-face all of the holes to a common plane regardless of irregularities in the surface of the tubesheet.

The invention is also directed to coordination of the operation of pivoted tool supporting arms on opposite sides of the steam generator primary side divider plate. Operation of the two arms is coordinated to spot-face the holes on both halves of the tubesheet to a single common plane and to position the tools at preselected corresponding holes on the two sides of the divider plate. After the two ends of a U-shaped tube are inserted in the corresponding holes, tools carried by the two arms determine the distance that each end of the tube protrudes through the tubesheet. The tool arm servicing the end protruding the shortest distance is operated to position that end of the tube flush with the spot-face and to expand the tube to thereby secure it in place. Then the second tool is operated to similarly align and expand the other end of the tube, and both ends are automatically welded in place. Operation of the tools carried by the two pivoted arms is coordinated in this manner at successive pairs of corresponding holes on opposite sides of the divider plate until all the tubes have been installed.

Use of the invention greatly decreases the time required to service a steam generator tubesheet and the exposure of workers to radioactivity. It also provides a precise map of the tubesheet which can be used for future reference.

DESCRIPTION OF THE PREFERRED EMBODIMENT

General Description

The invention will be described as applied to servicing the steam generator 1 shown in FIG. 1 for a boiling water nuclear reactor electric power generating system but it will become readily apparent that it can be applied to servicing other types of steam generator equipment. The system used in carrying out the invention includes two remotely controlled servicing machines 3, one of which is shown in detail in FIGS. 5 through 7. These machines are adapted to receive a number of tools for performing various functions within the steam generator and are operated by the control system which is illustrated schematically in FIGS. 8 and 9. The various tools include a probe for aligning the machine during setup and for mapping the precise location of each hole in the steam generator tubesheet, a drill and spot-facing tool for drilling out old tubes including plugged tubes and for simultaneously spot-facing the drilled out holes, and brushes for cleaning out the holes. Other tools used during the retubing process include an extractor which removes guides used to insert tubes through the tubesheet, an expander which positions the newly installed tubes flush with the tubesheet and expands them to bind them in place, a wire brush tool used to clean the weld area before and after welding, and a welding tool which automatically welds the expanded tubes. Finally, a closed circuit television camera is used to inspect the tube installation.

THE STEAM GENERATOR

Figure 1:
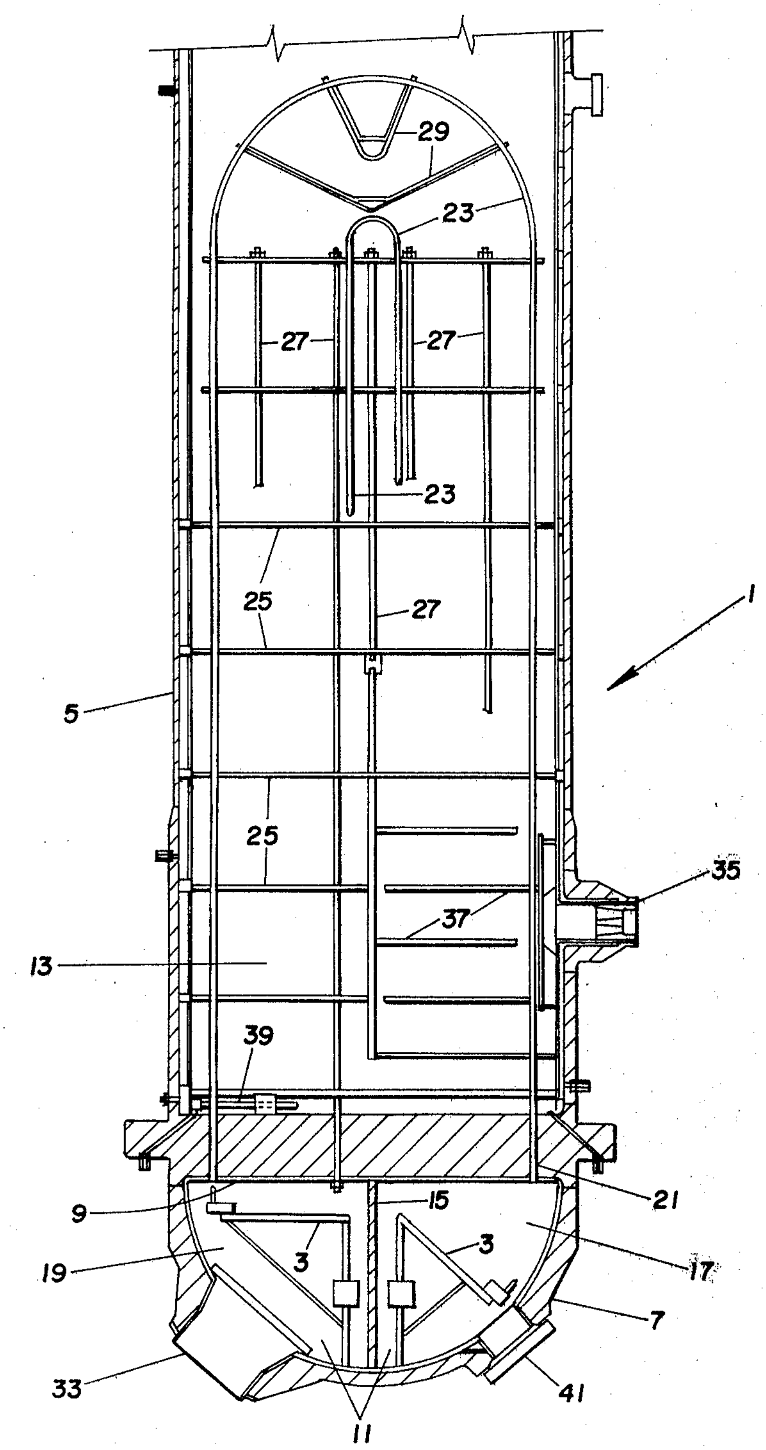
FIG. 1 is a vertical section view taken along the line I—I in FIG. 2 with some parts removed for clarity showing apparatus according to the invention in place in a steam generator.

Referring to FIG. 1, the steam generator 1 comprises a cylindrical body portion 5 which is fitted at its lower end with a hemispherical shell 7. A transverse steel plate 9, called a tubesheet, at the lower end of the cylindrical portion divides the steam generator into a primary side 11 below the tubesheet and a secondary side 13 above. The primary side 11, which is also referred to as the channel head, is divided in half by a vertical divider plate 15 into an inlet section 17 and a outlet section 19.

Figure 3:
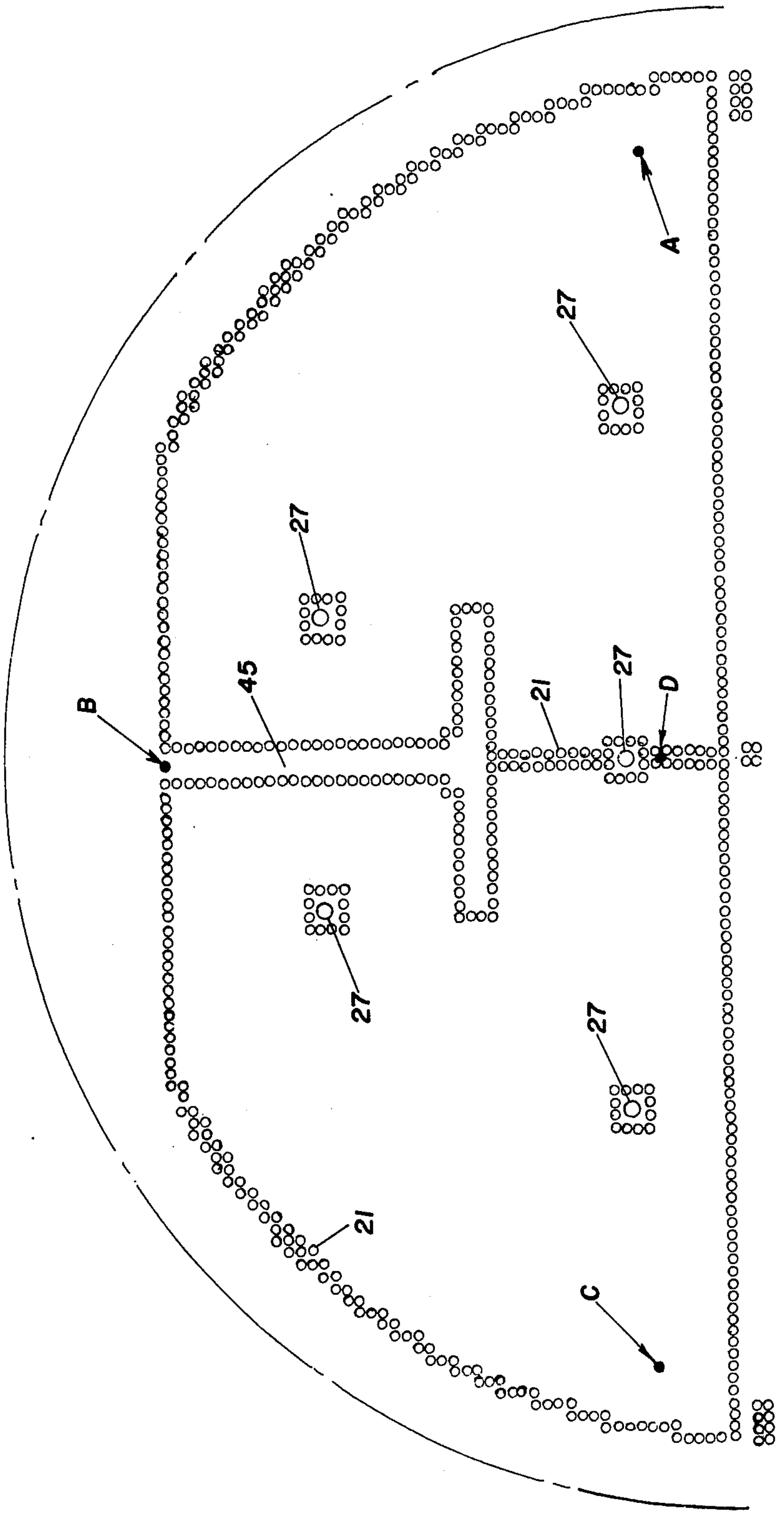
FIG. 3 is a plan view illustrating the array of holes in the tubesheet of the steam generator of FIGS. 1 and 2.

The tubesheet 9 is provided with an array of thousands of holes 21, as shown in the plan view of one-half of the tubesheet illustrated in FIG. 3. Several thousand U-shaped tubes 23 (only part of two of which are shown in FIG. 1 for clarity) are inserted into corresponding holes 21 on opposite sides of the tubesheet so that one end of each tube 23 communicates with the inlet section 17 of the channel head and the other end communicates with the outlet section 19. The tubes 21 are supported on the secondary side 13 of the generator by a series of separator plates 25 braced by tie rods 27 and by antivibration bars 29.

Figure 2:
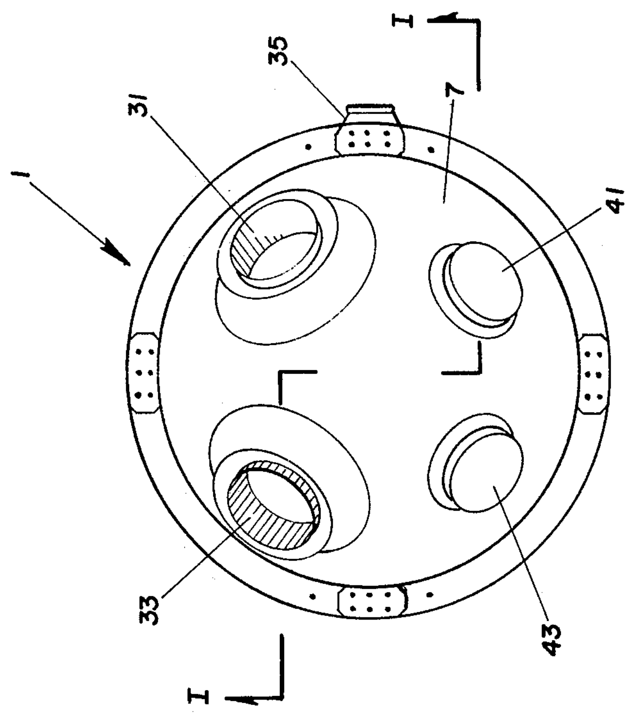
FIG. 2 is a bottom view of the steam generator of FIG. 1.

Primary coolant from the reactor enters the inlet side 17 of the channel head through inlet 31 (see FIG. 2), circulates through U-shaped tubes 23 and exits the outlet side 19 of the channel head through outlet 33. Secondary water introduced into the secondary side 13 of the generator 1 through secondary water inlet 35, circulates around the tubes 23 where it is converted to steam by heat released by the primary coolant. Baffles 37 form a preheater section which initially directs the secondary water around the inlet side of the tubes 23 for increased efficiency. The steam produced in the secondary side 13 rises into a steam drum (not shown) where water droplets are removed by demisters and passes out of the generator through a secondary outlet (not shown). T-shaped blowdown tubes 39, one on each side of secondary side 13 of the generator above the tubesheet 9 (only one shown in FIG. 1), are used to periodically inject pressurized fluid around the exterior of the tubes 23 to remove accumulated scale and residue.

Manways 41 and 43 provide access to the inlet side 17 and outlet side 19 of the channel head 11 for servicing. As shown in FIG. 1, apparatus 3 for servicing the tubes 23 and tube sheet 9 is inserted through the manways 41 and 43 and setup in the channel head on each side of the divider plate 15.

A typical array of holes 21 in a tubesheet 9 is illustrated in FIG. 3. As can be seen from the drawing, the holes in each half of the tubesheet 9 are arranged in rows which run horizontally in the figure and columns which are oriented vertically to form a basically semi-circular pattern. Certain holes in the array are missing such as those that would fall in the T-shaped area 45 below the blowdown tubes 39 and those that are replaced by the tie rods 27. Otherwise, the entire area within the semi-circular pattern is perforated with holes 21 although only the peripheral holes have been shown for clarity.

Figure 4:
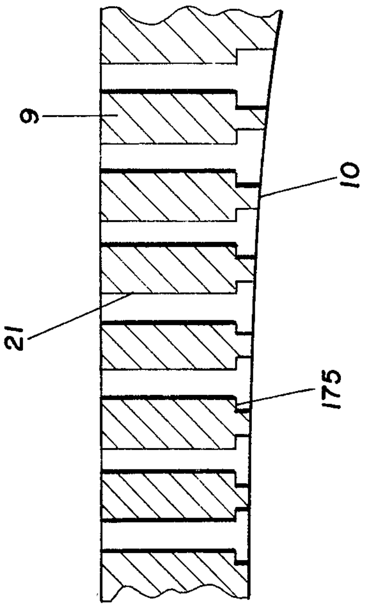
FIG. 4 is a vertical section through part of the tubesheet illustrating an exaggerated concave tubesheet surface.

The tubesheet 9 is a large steel plate which typically may be more than ten feet in diameter and close to two feet thick. The lower face 10 of the tubesheet is machined for flatness but, as a result of manufacturing tolerances, it is possible that this face 10 may be slightly concave or convex as illustrated in exaggerated form in FIG. 4. The amount of deviation from the flatness of the lower tubesheet surface is determined during the setup operation as discussed below.

SERVICING MACHINE

A complete description of the servicing machine 3 is provided in commonly owned application Ser. No. 888,701 filed on Mar. 21, 1978 referred to above. An appreciation of the construction of the machines sufficient for the purpose of understanding the present invention can be gained by reference to FIGS. 5 through 7 where it can be seen that a vertical column 47 is mounted in the channel head 11 adjacent the divider plate 15 and generally perpendicular to the tubesheet 9. The lower end of the column 47 is pivotally supported by a spherical bearing unit 49 welded to the shell 7. A second support means 51, fastened to the divider plate 15 by welding or other means, supports the upper end of the column 47. The column 47 is rotatably disposed within the second support means 51 by an antifriction bearing such as a ball or roller bearing (not shown). The second support means 51 also has a split collar 53 disposed thereon with a gap 55 which is closed by a hydraulic cylinder 57 to lock the column 47 in any of its rotated positions.

The second support means 51 provides for adjustments of the upper end of the column 47 in two orthogonal directions in a plane parallel to the tubesheet 9. Bolt 59 allows for the upper end of column 47 to pivot to the right and left about the spherical bearing support 49 in the plane of FIG. 5 while a dovetail and screw arrangement 61 permits movement of the upper end of column 47 in a direction perpendicular to the plane of the figure.

Figure 5:
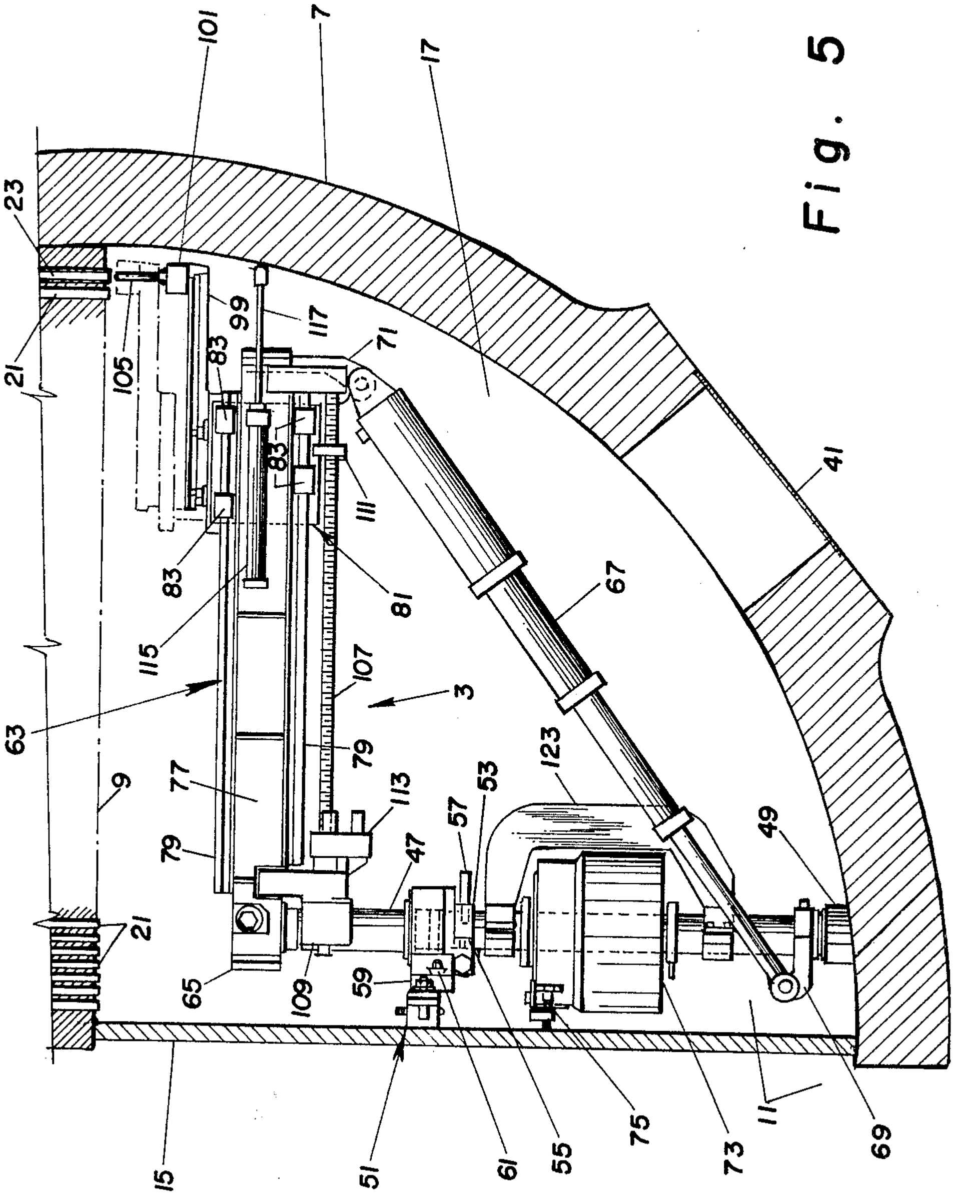
FIG. 5 is a side elevation view of a servicing machine according to the invention shown in place in one-half of the channel head of the steam generator of FIG. 1.

An arm 63 is pivotally connected to the upper end of column 47 by a suitable mounting bracket 65. The pivotal connection is such that the arm 63 rotates with the column 47 but can be pivoted from a position generally parallel to the tubesheet 9, as shown in FIG. 5, to a position wherein the free end of the arm is aligned with the manway 41. The arm is pivoted in this manner by a pair of hydraulic cylinders 67 (only one shown in FIG. 5) pivotally connected to the lower end of column 47 by a suitable bracket 69 and to the free end of the arm 63 by another bracket 71.

A reversible hollow shaft DC motor 73 mounted on the column 47 with a torque connection 75 to the divider plate 15 rotates the column 47 to pivot the arm 63 in a plane parallel to the tubesheet 9. The motor is provided with means for precisely indicating the angular position of the hollow shaft and therefore the arm 63.

The arm 63 comprises a pair of generally parallel rails or channels 77 (only one shown in FIG. 5) with ways 79 on the top and bottom portions of each channel 77. The ways 79 extend longitudinally along the arm and are parallel to each other. A carriage 81 slidably mounted on the ways 79 has pairs of bearings 83 which engage each of the ways 79 so that the carriage moves rectilinearly and parallel to the longitudinal axis of the arm 63.

Figure 6:
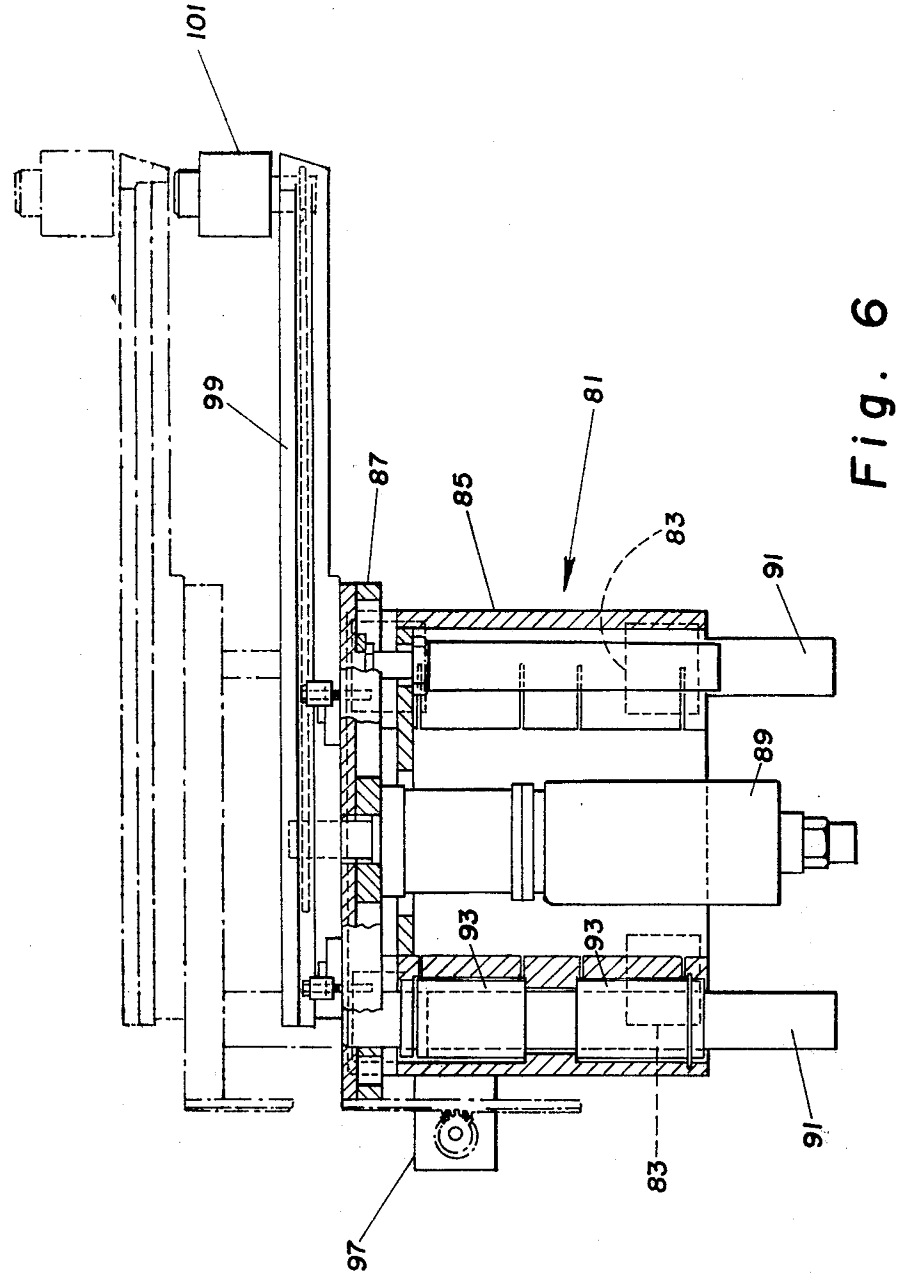
FIG. 6 is an enlarged longitudinal vertical section through the carriage mounted on the servicing machine of FIG. 5.
Figure 7:
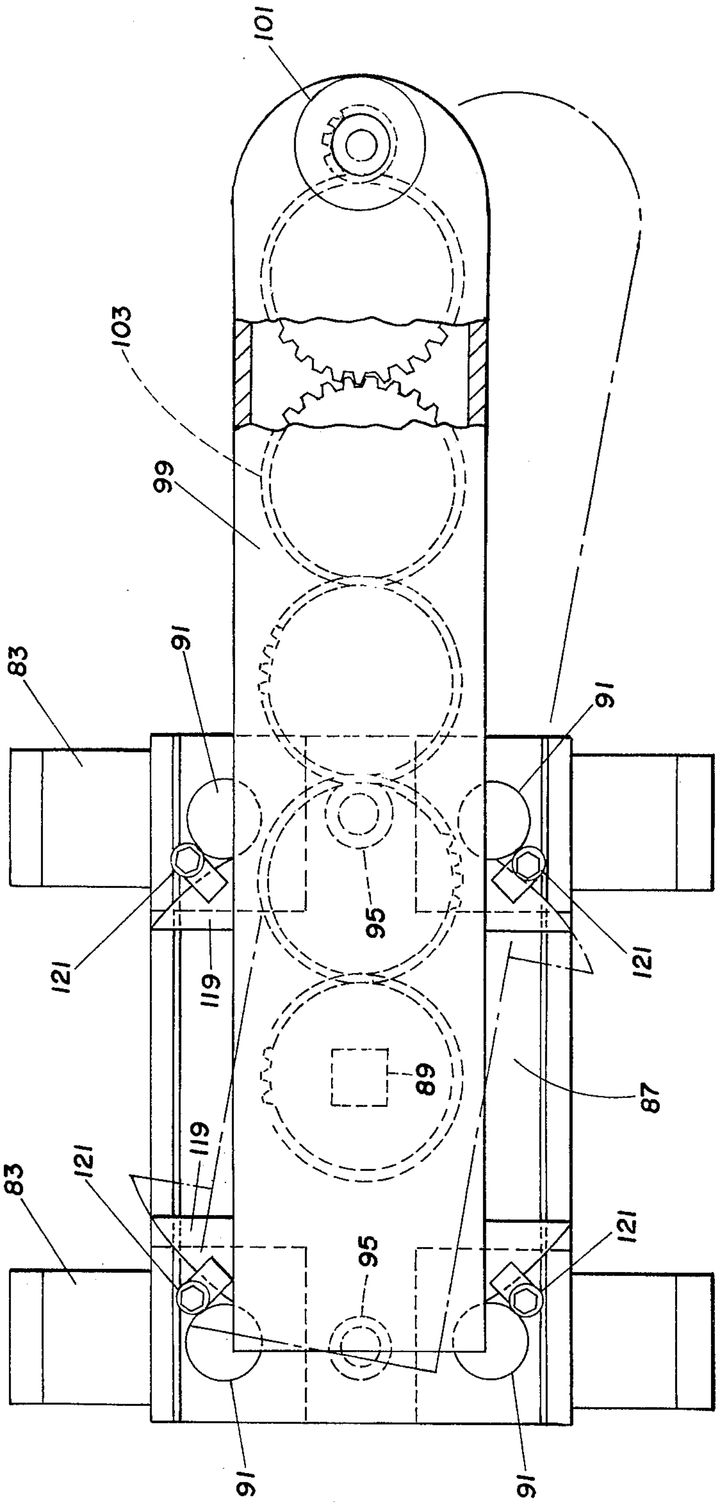
FIG. 7 is a plan view of the carriage.

The carriage 81, as shown best in FIGS. 6 and 7, comprises a baseplate 85 and a platform 87 disposed generally parallel to each other and generally parallel to the tubesheet 9 when the longitudinal axis of the arm 63 is parallel thereto. The baseplate 85 is connected to the bearings 83 and the platform 87 is disposed above and parallel to the baseplate 85. An air motor 89 or other suitable means for supplying a rotational drive force for various tools is connected to the platform 87.

Means for raising and lowering the platform 87 with respect to the baseplate 85 and for maintaining parallelism therebetween comprises four cylindrical posts 91, which are affixed adjacent the four corners of the platform 87, eight ball bushings 93 disposed in the base plate 85 for slidably receiving the posts 91, and a pair of double acting hydraulic cylinders 95 connected to the baseplate 85 and the platform 87. Means for indicating the speed and position of the platform 87 with respect to the baseplate 85 is shown generally at 97.

A cantilevered tool holder 99 is fastened to the platform 87 and coupled to the drive motor 89. The cantilevered tool holder has a tool receptacle or chuck 101 on the distal end thereof for holding a tool, and a train of gears or other drive means 103 connects the drive motor 89 to the tool chuck 101 providing power to drive the tool 105.

Referring back to FIG. 5, a ball screw 107, drive motor 109 and ball nut 111 are cooperatively associated with the arm 63 and carriage 81 to provide means for moving the carriage rectilinearly along the arm and for holding the carriage 81 at any position along the arm 63. The ball screw 107 extends the length of the arm 63 and is disposed generally parallel to the longitudinal axis thereof. The ball nut 111 is affixed to the carriage 81 and engages the threads on the screw 105. Resolvers 113 are provided for indicating the position of the carriage along the arm.

Disposed on the arm 63 are a pair of hydraulic cylinders 115 which have piston rods 117 that can be extended outwardly to contact the wall of the shell 7 to steady the arm 63 when the tool 105 is performing an operation on the tubes 23 or tubesheet 9.

The cantilevered tool holder 97, as shown best in FIG. 7, has arcuate plates 119 equally spaced on opposite sides of the axis of the drive motor 89. Lugs 121 clamp the arcuate plates 119 and tool holder 99 to the platform 87. Dowels and dowel holes (not shown) are provided in the arcuate plate and in the platform so that the cantilevered tool holder can be aligned with the axis of the arm as shown in FIG. 6, rotated 180°, or rotated to form selected acute angles with respect to the axis of the arm as shown in FIG. 7. The varying positions of the tool holder and the short column 47 provide access to all of the tubes in one-half of the tubesheet and establish accurate positioning of the tool holder to allow remotely controlled repeated operation on any tube in that half of the tubesheet. The described tool holder is specifically adapted for holding the drilling tool and may also be used to support the probe or brush. Other tool holders, carrying other tools, may also be mounted on the carriage 81. Tool changes are effected by aligning the free end of the arm 63 with the manway 41 as shown in the right side of FIG. 1. While the tool holder shown is manually rotated to the desired position and locked in place, an automatic slewing tool holder, such as that disclosed in commonly owned U.S. patent application Ser. No. 896,530 filed on Apr. 14, 1978, may also be utilized.

A C-shaped stiffening bracket 123 is fastened to the column 47 spanning the motor 73 in order to reduce the deflection in the column 47.

The described servicing machine may be easily and quickly installed inside the head of a steam generator and with an assortment of tools can perform various operations on all of the tubes in one-half of the tubesheet. The apparatus so structured is rugged and reliable so that it can operate within the close tolerances necessary to retube a steam generator utilizing remote control. To operate remotely, the angular position of the arm and column must be repeatable. Accurate angular positioning and indicating the angular position of the column and the arm is provided by the motor 73 and once the column and arm are positioned in the desired angular position, the split collar 53 locks the column 47 in that position.

The carriage 81 is positioned by rotating the ball screw and the motor has a brake disposed therein to maintain the screw in any desired position. The nut which rides on the threads of the screw has a plurality of balls which engage the threads. This combination minimizes any backlash, allowing very accurate positioning of the carriage. This combination is not subject to be backdriven by the carriage, therefore, with the drive motor brake engaged, the carriage remains in a fixed position.

The hydraulic cylinders which raise the arm 63 from a position aligned with the manway 41 to a position where it is generally parallel to the tubesheet 9 preferably act against a stop, when in the latter position, to increase the rigidity of the apparatus.

THE SYSTEM

Figure 8:
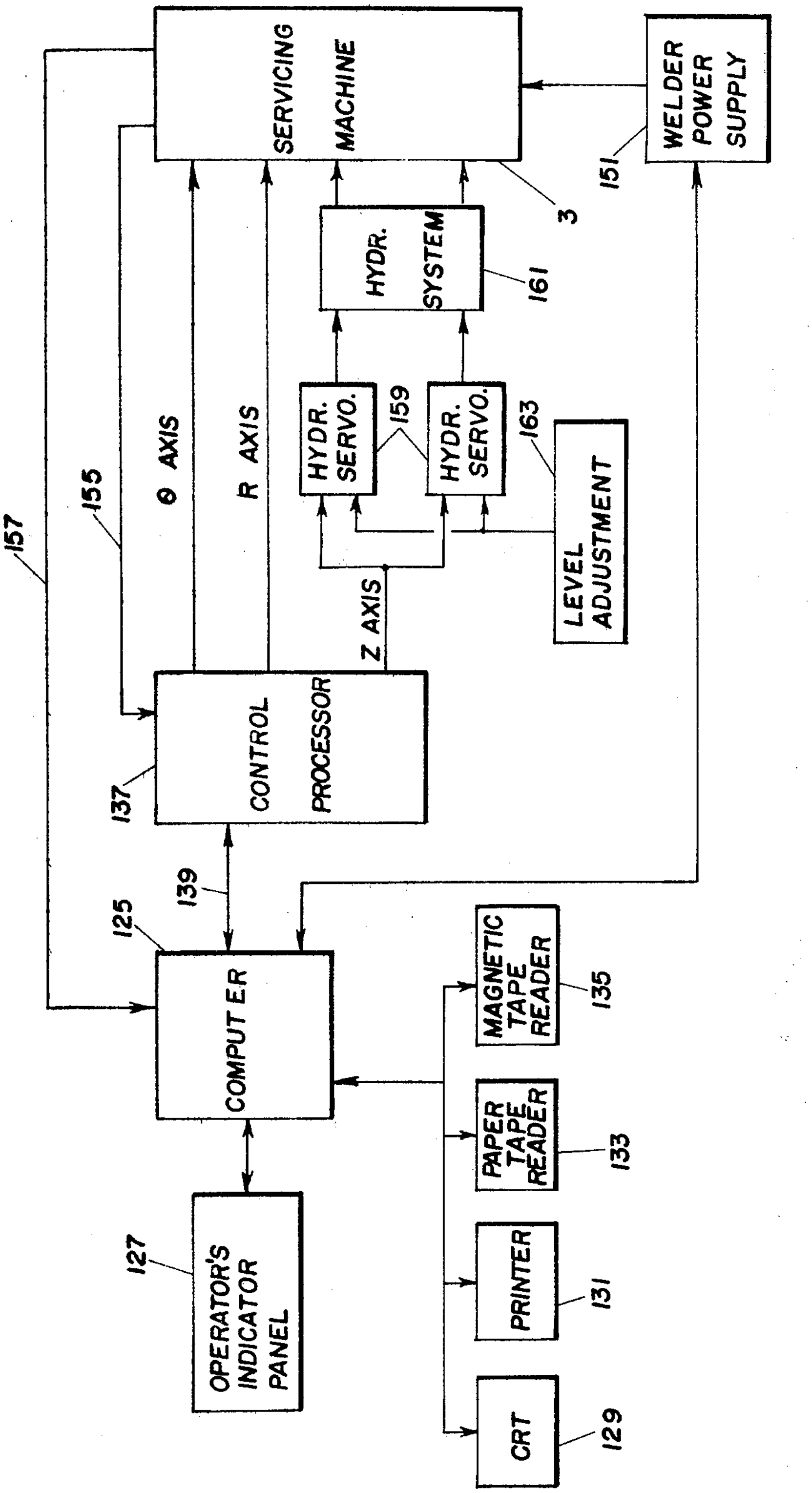
FIG. 8 is a schematic diagram in block diagram form of a control system in accordance with the invention.

FIG. 8 illustrates schematically in block diagram form the servicing system. The system is controlled by a digital computer, such as a Westinghouse 2500 Model D, with the following features: power failure detection and protection, automatic restarting, bootstrap loader, real time clock and a 64 K 16 bit/word nonvolatile memory. An operator's indicator panel 127 provides the operator with visual indications of system performance and status. A cathode ray tube (CRT) display unit 129, with an integral alphanumeric keyboard and off-line editing features, functions as the main man-machine interface permitting the operator to input operating parameters, data and instructions to the computer, to display and edit input information, and to have the collected data or programmed responses automatically displayed for visual inspection. A hard copy printer 131 with an integral alphanumeric keyboard functions as a hard copy data input/output device with the keyboard used as a backup CRT data input device. The computer is programmed through a paper tape reader 133 and two magnetic tape units 135 are used to input mass data, such as the tube array for the generator being serviced.

The computer 125, supported by its peripheral equipment, functions as a monitoring and control element for the system. The computer monitors all strategic system parameters and controls all of the tool operating functions through a control processor 137. The control processor 137 provides absolute position control for three axes on the servicing machine 3, including: the angular position of arm 63 (the $\theta$ axis) through control of motor 73; the position of the carriage 81 along the arm (the R axis) through control of carriage drive motor 109; and for the vertical position of the tool above the carriage (the Z axis) through control of double-acting hydraulic cylinders 95. The drive system is configured to be a high performance closed loop servo control system with a high degree of accuracy, speed response and positioning control.

Figure 9:
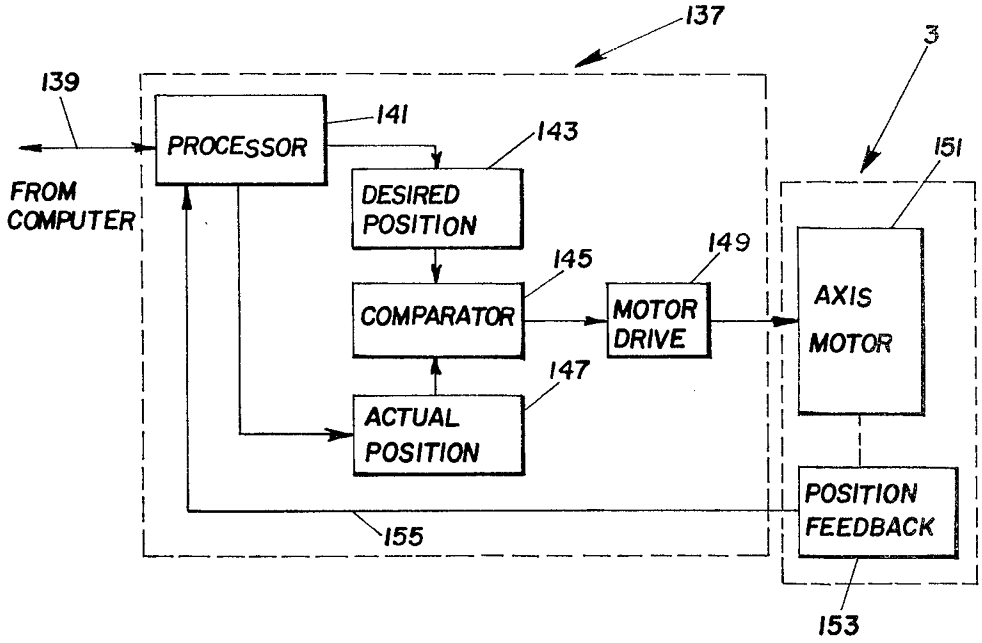
FIG. 9 is a block diagram illustrating in more detail the control system for one axis of the system shown in FIG. 8.

The main element of each axis drive system is an absolute position controller using a remote positive feedback unit in a closed loop position control system, as shown in FIG. 9. The input data for each axis is entered from the computer 125 through line 139 into the control processor 137 which distributes the operational data to the preselected axis processor 141 and enters the desired axis position into the axis memory 143. The axis position comparator 145 then determines the amount the drive motor is to move and in which direction by comparing the desired position with the actual position in position indicator 147. The output of the comparator 145 is applied to the axis motor drive 149 which applies electric power of the proper polarity and magnitude to the axis motor 151, e.g. carriage drive motor 109. As the selected motor turns, the position feedback unit 153 associated therewith (such as resolver 113) reports back to the axis processor 141 through line 155. When the desired and actual positions are equal, the motor drive stops. As shown in FIG. 8, the control processor 137 reports back axis movement to the computer over line 139. During drilling operations, the drill bit speed is fed back directly to the computer 125 over line 157 so that the drill bit feed rate may be adjusted to accommodate for changes in drill speed due to variations in hardness of the drilled material, drill bit wear, etc.

While each axis of the control processor 137 functions in the same manner to generate control signals for the associated drive element on the servicing machine 3, the Z axis signal is applied to two hydraulic servos 159 which regulate the flow of hydraulic fluid from a hydraulic system 161 to the two double-acting hydraulic cylinders 95 which raise and lower the platform 87 carrying the tool holder 99. A level adjustment 163 can be used to set the hydraulic servos 159 for leveling the platform 87.

The above described closed loop control system is used in positioning and controlling the tools in all of the following operations: setup, mapping, drilling/spot-facing, tube guide removal, wire brushing, tube positioning/expanding, welding and weld inspection. While the positioning of the welding tool is controlled in the computer 125, the welding parameters are automatically regulated by the welding power supply 165. Upon completion of the welding cycle, the power supply 165 notifies the computer which positions the tool at the next hole and sends another start signal to the welding power supply.

The computer 125 controls and monitors the operation of the two servicing machines 3 through similar control processors 137. It also coordinates operation of the two servicing machines during retubing as discussed below.

THE TOOLS

Figure 11:
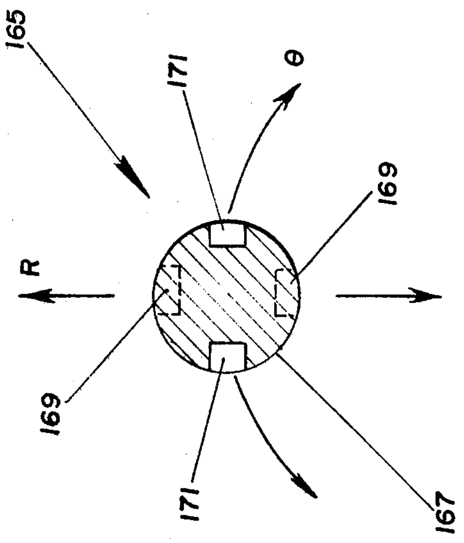
FIG. 11 is a horizontal section through the probe of FIG. 10 schematically showing sensor orientation.
Figure 10:
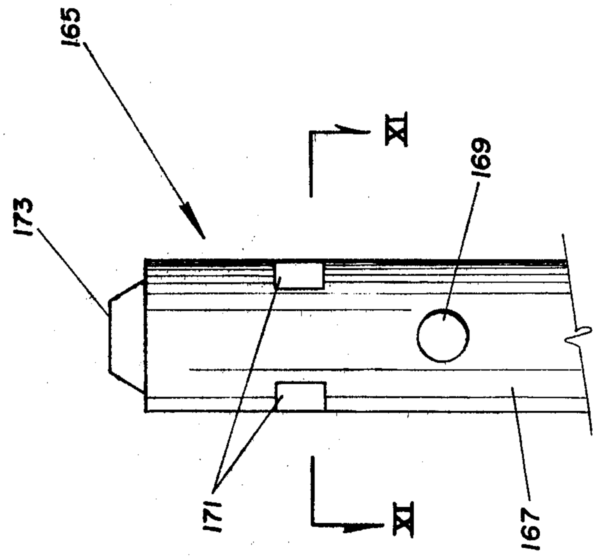
FIG. 10 is a side elevation view of a probe suitable for use with the invention.

Various tools or end effectors may be used with the servicing machine. These tools include a probe 165, such as that shown in FIGS. 10 and 11, having an elongated body portion 167 which may be inserted into the holes 21 in the tubesheet. Orthogonally disposed pairs of sensor coils 169 and 171 are mounted in the side walls of the probe 165. Each pair of coils forms an eddy current proximity detector which generates a null signal when the probe is located equidistant from the axis of that coil pair to the walls of the hole in which the probe is inserted. With the probe 165 mounted in the tool holder 99 with the axis of coils 169 parallel to the axis of movement of the carriage 81 (the R axis) and the axis of coils 171 parallel to the tangent to the rotational movement of the boom 63 (the $\theta$ axis), the signals generated by the sensors can be used in the drive system of the servicing machine as discussed below to precisely locate the centers of the holes 21. The probe 21 is also provided with an end proximity sensor 173 which, as discussed below, can be used to determine the presence or absence of a hole at a particular location and the distance between the servicing machine carriage and the tubesheet 9 (the Z axis component) for the purposes discussed below. Suitable probes of the type described or others are available on the market. As an alternative, the end proximity detector can be replaced by a limit switch to determine the Z axis component.

Another tool used by the servicing machine is a drilling and spot-facing tool. This tool, which is driven by the motor 89 through the gear train drive 103, is used to drill out plugged holes and old tubes. The drill bit is provided with a shoulder which spot-faces the drilled out holes as at 175 in FIG. 4. Another tool adapted for use with servicing machines is a brush which may be inserted into the tube for cleaning prior to retubing. A surface brush may also be used following tube alignment for preparing the surfaces for welding and for weld cleaning before inspection.

Since, as explained below, guides are inserted into the ends of the replacement U-shaped tubes 23 to guide them through the separator plates and the tubesheet 9, another tool is utilized to extract these guides following tube insertion. A suitable tool for this purpose is described in the commonly owned U.S. patent application Ser. No. 898,348 filed on Apr. 21, 1978.

A tube expander tool is also used with the machine to expand the newly installed tubes in the holes 21 to seal the holes and secure the tubes in place for welding. Tools of this sort are available on the market. A hydraulic tube expander particularly suitable for this purpose is described in commonly owned application Ser. No.

810,817 filed on June 28, 1977. Roller type tube expanders may also be used, such as that shown in U.S. Pat. No. 2,835,307 and in commonly owned U.S. patent application Ser. No. 932,583 filed Aug. 10, 1978. Welding tools which automatically weld around tube ends are available on the market and can be controlled by the servicing machine. Finally, a closed circuit TV camera may be mounted on the carriage for inspecting the finished welds.

The probe, the drill and the brushes may be mounted on the tool holder shown and described in connection with FIGS. 6 and 7. The other tools which either have their own drive unit built in or do not require drive power, such as the closed circuit TV camera, may be mounted on a tool arm without the gear train drive shown in FIG. 7.

For changing the various tools, the arm 63 is rotated and the hydraulic cylinders 67 are operated to align the outwardly extended carriage 81 with the manway 41, as seen in the right side of FIG. 1. In this manner, the tools can be quickly changed with minimum worker exposure to radiation in the channel head.

OPERATIONS

In general terms, servicing machines 3 are set up in both sides of the steam generator channel head 11 and the parallelism of the arms 63 and the depth of the spot-face plane are determined as described below. The remaining functions performed by the servicing machines 3 can roughly be classified as detubing and retubing operations.

Detubing includes mapping the tubesheet 9 in the manner described below to determine the precise location of each hole in the array. It also includes drilling out the holes and spot-facing them as also described below.

Retubing includes inserting the ends of U-shaped tubes in corresponding tubesheet holes communicating with the inlet and outlet side of the channel head respectively and extracting the guides used to drive the tube ends through the separator plates and the tubesheet. The ends of the tubes are then aligned flush with the spot-face surface adjacent each hole and secured in place by a tube expander. The tube ends are then welded in place and, following brushing, the welds are remotely inspected by closed circuit TV.

A. SETUP

The first setup in servicing the steam generator is to set up the servicing machine 3 in the channel head 11 of the steam generator with the plane of rotation of the arm 63 parallel to the bottom face of the tubesheet 9. The machine is initially setup manually with the arm as parallel to the tubesheet face as can be determined by the worker using, for example, the method and apparatus described in the commonly owned currently filed application Ser. No. 952,433 referred to above.

Figure 12:
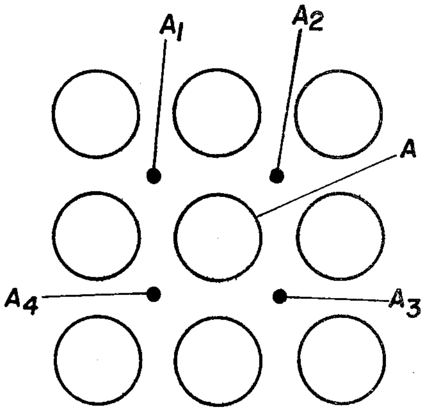
FIG. 12 is an enlarged plan view of a portion of the tubesheet hole array shown in FIG. 3.

For bringing the arm into precise alignment parallel to the tubesheet, the distance between the arm 63 and the tubesheet 9 is determined automatically by the system at three widely separated points referred to as parallel points A, B and C. In order to achieve better accuracy in establishing the plane of the tubesheet, the parallel points A, B and C are located near the periphery of the hole array and at the 0°, 90° and 180° points respectively as shown in FIG. 3. When these measurements, which are taken in the form of electrical signals generated by the probe, are within a predetermined tolerance of each other (e.g. 0.001 inch), the arm may be considered parallel to the tubesheet and the system can be advanced to the next operation. In view of the high accuracy required for the alignment, four measurements are taken at each location A, B, and C to generate an average value. As seen in FIG. 12, the four measurements used at location A are taken at data points $A_1$ through $A_4$ in the land areas surrounding the hole A which is at the center of the location. Four similarly spaced measurements are also taken at data points surrounding location B although there is no hole located there. If the difference between the average measurements taken at parallel points A, B and C is not within the preset tolerance, the alignment of the support column 47 is adjusted as described above and the measurements are repeated until parallelism is achieved.

Figure 13:
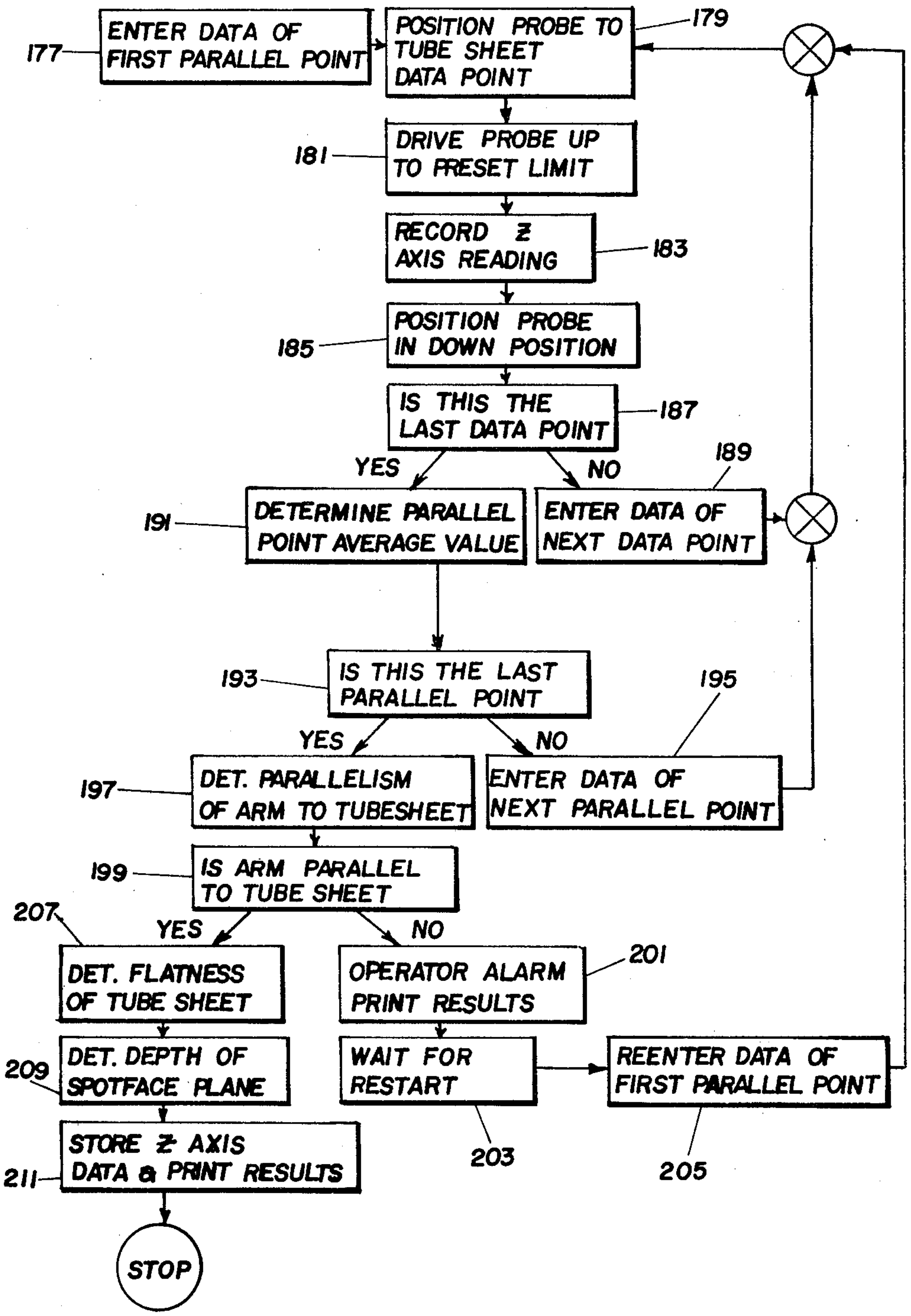
FIG. 13 is a flow chart schematically depicting the steps performed by the system in setting up the servicing machine.

The procedure is described schematically in the flow chart of FIG. 13. As indicated in block 177, the data of the first parallel point is entered and the arm 63 and the carriage 81 are positioned angularly and longitudinally respectively as in block 179 to align the probe 165 mounted on the carriage under the first data point. The probe is then driven up as indicated in block 181 until the proximity end probe generates a preset signal indicative of a preset distance from the tubesheet or the limit switch is activated. The elevation of the probe, which is indicative of the distance between the arm and the face of the tubesheet, is recorded as in block 183 and then the probe is lowered for repositioning as in block 185. If this is not the last of the four points around the selected location A, B and C as determined in block 187, the coordinates of the next data point are entered as in block 189 and the previous steps are repeated. When the measurements at all four data points have been completed, the average measurement for that parallel point is determined in block 191. If this is not the last of the three locations A, B and C as determined in block 193, the data of the next parallel point is entered as indicated in block 195 and the average distance for each location is determined as above. The average distances for the parallel points A, B and C are then compared in block 197 to determine if the arm is parallel to the tubesheet. If the average distances are not within the preset tolerances, such as ±0.001 inches, as determined in block 199, an operator alarm is generated and the average distances are printed out, block 201. The system then waits for a restart command, block 203, while the alignment of the support column 47 is adjusted as described above based upon the printed results. After realignment, the operator initiates a restart which reenters the data for the first parallel point at block 205 and the entire above described sequence for checking parallelism of the arm 63 and tubesheet 9 is repeated.

When it is determined in block 199 that the distance to the three parallel points is within the preset tolerance and therefore the arm is parallel to the tubesheet, the flatness of the tubesheet is determined in block 107. Since the known deviations from flatness for the tubesheet are either a concave or convex face, only one additional reading as at point D (see FIG. 3) near the center of the tubesheet need be taken. This is accomplished by retracting the carriage 81 carrying the probe to a point near the pivoted end of arm 63, taking four measurements of the distance to the tubesheet around the location D and averaging them as in the cases of points A through C. If the distance between the arm and the tubesheet at point D is greater than the distances at A through C, then the tubesheet is concave, whereas it is convex if point D is closer to the arm than the other points. In any event, the determination of the spot-face plane location is made in block 109 by adding a preset tolerance to the greater of the distances of the parallel points A, B or C or the point D from the arm, and this Z axis information is stored and printed out as in block 211. Preferably, the parallel point and D point readings for both sides of the tubesheet are compared and a common spot-face plane is established across the tubesheet.

B. MAPPING

The probe 165 is also used in mapping the holes in the tubesheet to determine the precise location of each of the thousands of holes which may be arranged in a pattern, such as that illustrated in FIG. 3. By way of example, the holes in the tubesheet may be 0.762 to 0.767 inches in diameter with the rows and columns spaced on 1.0625 inch centers. While the tubesheets are carefully machined during manufacture, it is desirable during servicing of the steam generator to determine the location of the holes to the nearest 0.001 inch.

Figure 14:
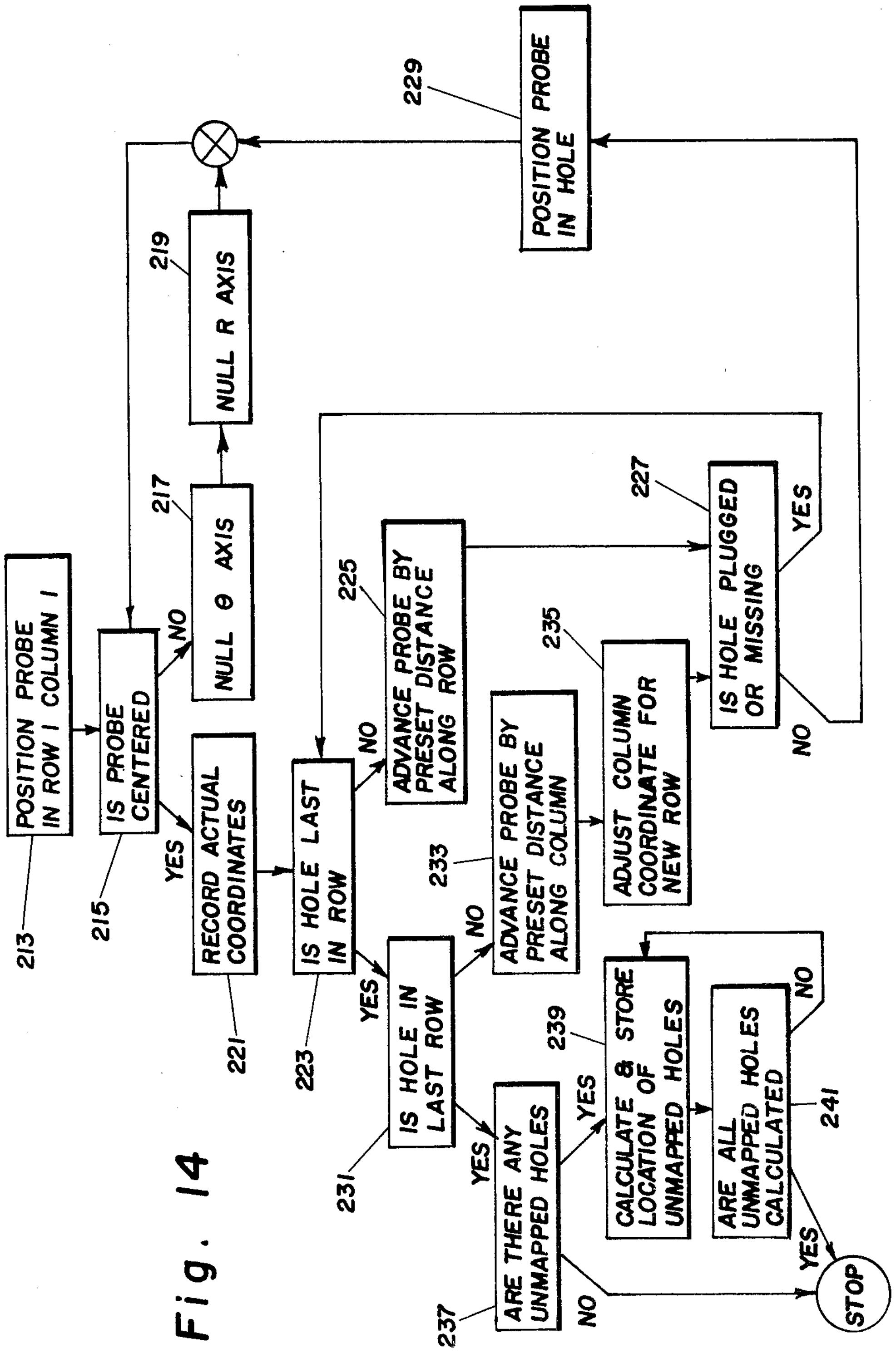
FIG. 14 is a flow chart schematically depicting the mapping operation.

The mapping procedure is set forth schematically in the flow chart of FIG. 14. The R and $\theta$ drives which respectively control the angular position of the arm 63 and the longitudinal position of the carriage 81 are actuated to position the probe 165 under the best known position of the hole at row 1, column 1 as entered by the operator. The Z axis drive which controls the vertical movement of the platform 87 on the carriage 81 is then activated to insert the probe into the hole as indicated in block 213. If the probe is not centered as indicated by the absence of a null on the $\theta$ or R axes sensors, block 215, the $\theta$ or R axis drives are actuated to null the respective sensors as indicated at blocks 217 and 219. Since adjustment of the null position on one axis may affect that of the other axis, the probe centered check is made again in block 215 after each adjustment until the precise center of the hole is located. The actual location of the hole to the nearest 0.001 inch is then stored as in block 221.

If this is not the last hole in the row as determined in block 223, a preset distance equal to the nominal distance between columns, in the example 1.0625 inches, is added to the column coordinate and the probe is advanced to the resultant position as in block 225. The end sensor on the probe is then utilized to determined whether this new hole is plugged or missing as in block 227. If it is plugged, this fact is recorded and the probe is advanced to the next hole in the row by returning to block 223. If this new hole is not plugged or missing, the probe is inserted into the hole as in block 229 to a depth suitable for operation of the R and $\theta$ sensors and the precise location of the hole is determined and recorded as previously described.

When the precise location of the last hole in the row has been determined as in block 223, and it is not in the last row, block 231, the nominal distance between rows, again by way of example, 1.0625 inches is added to the row coordinate to align the probe with the next row as in block 233. Since the rows do not have an equal number of holes due to the shape of the hole array, the column coordinate is adjusted in block 235 for each new row to position the probe at the first hole in that row. The test is then made again for a plugged or missing hole as in block 227 and the mapping of the row continues as previously described.

When all of the holes in all of the columns have been similarly mapped as determined in block 231, a review is made of unmapped i.e. plugged holes in block 237. If there were no plugged holes, mapping is completed. If there were plugged holes, their location is calculated and stored in block 239 by applying the nominal distances between rows and columns to the location of holes adjacent the plugged holes. When the location of all of the plugged holes has been calculated, as determined in block 241, the mapping operation is completed.

The precise location of each hole in the array and whether or not it is plugged is stored by the system for use in performing further operations at each hole location and may be printed out to provide a precise map of the tubesheet array.

It has been found that for large sections of the tubesheet hole array, the location of each hole can be determined within satisfactory tolerances without inserting the probe into each and every hole. Instead, the probe may be inserted in every third or fifth hole, for example, with the location of the skipped holes being calculated by adding the nominal distance between holes to the coordinates of the closest probed hole. For instance, if the probe is only inserted in every fifth hole in a row, the location of the second hole is determined by adding the nominal distance between holes, in the example 1.0625 inches, to the column coordinate of the first hole. Twice this distance, or 2.125, is added to the first hole column coordinate to determine the location of the third hole. Similarly, the locations of the fourth and fifth holes are determined by subtracting 2.125 and 1.0625 inches respectively from the column coordinates of the sixth hole after it has been probed. The row coordinate is made equal to that of the hole used in determining the column coordinate.

In like manner, rows may be skipped as well as columns so that only holes in every third or fifth row, for example, are probed with the locations of the skipped holes being determined by calculation from the nearest probed holes. As an illustration, if only holes in every third row and column are probed, such as the center hole A in FIG. 12, the locations of the six holes surrounding hole A can be calculated by adding or subtracting the nominal distances on rows and columns to the measured coordinates of hole A. It can be appreciated that the locations of the six holes surrounding each probed hole can be determined in a similar manner.

As applied to the flow chart of FIG. 14, the preset distance that the probe is advanced along the row as indicated in block 225 will be equal to the distance between probed holes or, for example, three or five times the nominal distance between holes where only every third or fifth hole is probed. If the hole selected for probing is plugged or missing, the preset distance added in block 225 the next time may be equal to plus or minus the nominal distance between holes so that either the next hole or the previous hole is substituted for the plugged or missing hole. When the preselected number of holes in the row have been probed, the probe is advanced the preset distance along the columns block 233, again for example three or five times the nominal distance between rows, to align the probe with the next selected row.

After probing is completed as indicated in block 231 and it is determined in block 237 that there are unmapped holes which, of course, there will be if holes have been skipped, the location of the skipped holes and unplugged holes, if the probe found any, are calculated in block 239 in the manner explained above. When all the unmapped holes have been located as determined in block 241, mapping is completed.

C. DRILLING AND SPOT-FACING

Once a map of the precise location of each hole in the tubesheet has been made, the drilling and spot-facing tool is inserted in the tool holder 99 and the holes are drilled out to remove the ends of the old tubes and any plugs. As explained above, the drill is provided with a shoulder which spot-faces the drilled out holes. The depth of drilling is controlled by the system such that all of the holes 21 are spot-faced as shown at 175 in FIG. 4 to the common plane established during the setup operation described above regardless of any curvature of the tubesheet lower face 10. As also mentioned previously, the computer monitors drill speed and adjusts the drill feed rate to accommodate for variations in material hardness.

D. RETUBING

The U-shaped tubes 23 are inserted in the tubesheet 9 from the secondary side with the ends of the tube in corresponding holes on opposite sides of the divider plate 15. The tubes are inserted so that both ends extend one-quarter to one-eighth inch below the spot-face surface adjacent the corresponding holes 21. The operation of the two servicing machines 3, one on each side of the divider plate 15 in the channel head 11, is then coordinated to position and secure the tubes with their ends flush with the spot-face surface.

Figure 15:
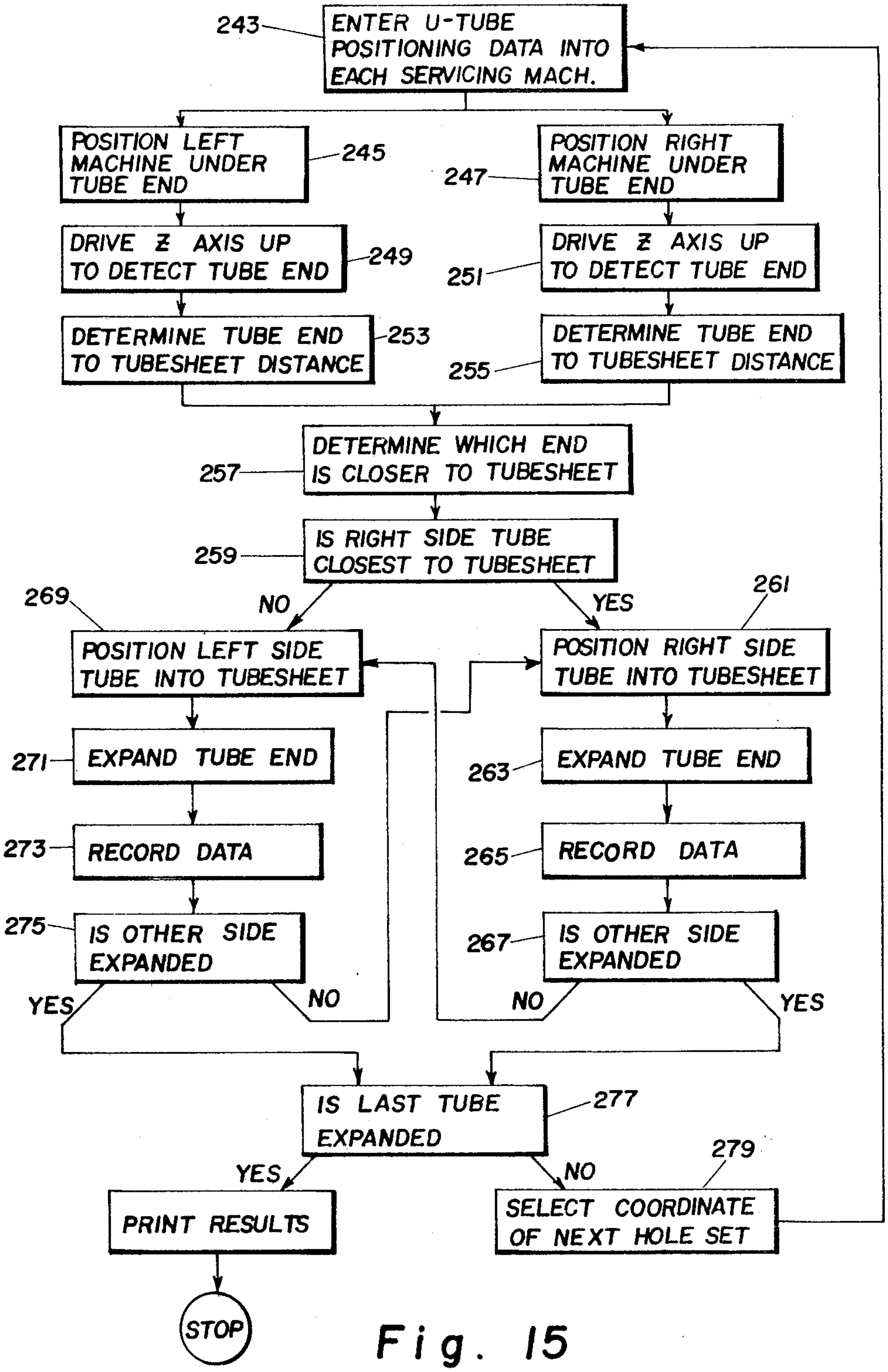
FIG. 15 is a flow chart schematically depicting the steps performed by the system in coordinating the operation of two servicing machines during retubing of a steam generator.

A flow chart schematically illustrating the procedure is shown in FIG. 15. The positioning data for the first pair of corresponding holes is entered into each servicing machine 3 at block 243. The left and right servicing machines are then positioned with the tool holder aligned with appropriate corresponding holes as in blocks 245 and 247 respectively. The Z axis of the two machines are then driven up as in blocks 249 and 251 to detect the end of the tube extending downward through the tubesheet. This may be effected with a limit switch carried by the tool holder and as disclosed in the commonly owned and concurrently filed application Ser. No. 952,430, this limit switch can be mounted on a tube expander tool. The distance that each tube protrudes below the face of the tubesheet is then determined in blocks 253 and 255 using the distances measured during the setup operation. These two tube end to tubesheet distances are then compared in block 257 to determine which tube end is closer to the tubesheet. If the right side is closest, as determined in block 259, the platform holding the expander tool on the right side servicing machine is raised to align the end of the right side tube flush with the spot-face 175 as indicated in block 261. The tube end is then expanded by the expander tool as in block 263 to secure the tube end in place for subsequent welding and the fact that this step has been performed is recorded in block 265. If the other tube end has not yet been expanded as determined in block 267, the left side tube end is aligned flush with the spot-face as indicated at block 269, the tube is expanded as in block 271 and the data is recorded as in block 273. Since, in this example, the other tube end has been expanded as determined in block 275, the system will advance to block 277 to determine if all the tubes have been expanded. It can be appreciated, however, by studying FIG. 15 that the tube end closest to the tubesheet will be aligned and expanded first and then the other will be secured. This is done to assure that the other tube end, which will tend to ride up when the first end is pushed upward, will still extend below the tubesheet and can be positioned by pushing upward after the first end has been secured by expansion.

If it is determined in block 277 that there are more tubes to be aligned and secured, the coordinates of the next corresponding pairs of holes is determined in block 279 and the above steps are repeated. The ends of each of the thousands of tubes in the tubesheet are secured in a similar manner. When the last tube has been secured as determined in block 277, the results are printed out as in block 279.

OTHER OPERATIONS

Figure 16:
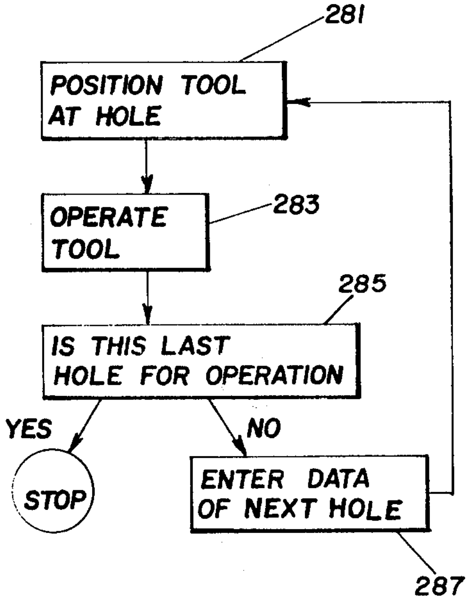
FIG. 16 is a flow chart schematically depicting the steps performed by the system in sequentially performing general operations at each hole in the tubesheet array.

Following expansion of the tubes to secure them for welding, the surfaces to be welded are cleaned by a wire brush tool and welded. The welds are then inspected by closed circuit television. Once the welding tool is positioned by the servicing machine under the tube to be welded, the tool operates automatically to direct the welding arc in a circular path around the end of the tube. Similarly, the tube guide extractor and tube expander also operate automatically once they are positioned. Hence the system only need position these tools sequentially at each location where the specified operation is to be performed and then initiate tool operation. This sequence is shown schematically in the flow chart of FIG. 16. As indicated in block 281, the tool is positioned by the servicing machine 3 at the first hole on which the operation is to be performed. Tool operation is then initiated as in block 283 and, following completion of the operation, a determination is made in block 285 if there are any more holes on which the operation is to be performed. If so, the exact coordinates of the next location as determined in the mapping operation are entered as in block 287 and the sequence is repeated until the operation has been performed at every hole. while it will be recalled from the discussion above that the power supply for the welder may be directly controlled by the welder, the welding tool itself is controlled in the manner just described.

While the invention has herein been shown and disclosed in what is conceived to be a practical and effective embodiment, it is recognized that departures may be made therefrom within the scope of the invention, which is not to be limited to the details disclosed herein but is to be accorded the full scope of the appended claims as to embrace any and all equivalents.

We claim:

1. A method of servicing a steam generator in which tubes are inserted in an array of holes in a tubesheet, said method comprising the steps of:

mapping the tubesheet by maneuvering a probe across the tubesheet to precisely locate each of said holes, generating a representation of each precise hole location and storing each of said representations; and maneuvering a tool sequentially to the precise location of each hole in the tubesheet in response to said stored representations of said hole locations and controlling said tool to perform a preselected operation at each such hole location.

2. The method of claim 1 including the steps of changing the tool to a second tool, maneuvering said second tool sequentially to the precise stored location of each hole in the tubesheet in response to said stored representations and operating said second tool to perform a second preselected operation at each such hole location.

3. The method of claim 1 wherein said preselected operation is drilling out and spot-facing each hole.

4. The method of claim 3 including the steps of positioning one end of a tube into a hole in the tubesheet and controlling a tool to secure said tube in place in the tubesheet.

5. The method of claim 4 including the step prior to securing the tube in place of controlling a tool to align the end of the tube flush with said spot-face.

6. The method of claim 4 wherein the step of securing the end of the tube in place includes the steps of controlling a tool to expand the tube in place in the tubesheet and the step of controlling a welding tool to weld the tube end to the tubesheet.

7. The method of claim 1 wherein the step of mapping the precise location of the holes in the tubesheet comprises the steps of sequentially maneuvering a probe responsive to the proximity of the walls of the tubesheet holes to a position approximately aligned with the axis of selected holes, advancing the probe into said holes, maneuvering the probe in response to signals generated thereby until it is located in the center of said holes, generating representations of the locations of the probe at which it is so centered and storing such representations.

8. The method of claim 7 wherein said selected holes include substantially all the holes in the tubesheet.

9. The method of claim 7 wherein said selected holes include less than all said holes and the locations of the holes which are not probed are determined by applying the nominal distances between rows and columns to the representations of the measured location of the probed holes and storing the resultant representations.

* * * * *